A. B. BOND.
HEATING AND VENTILATING SYSTEM FOR INCUBATORS AND BROODERS.
APPLICATION FILED SEPT. 2, 1914.

1,247,496.

Patented Nov. 20, 1917.
3 SHEETS—SHEET 1.

Inventor
A. B. Bond,
By Victor J. Evans
Attorney

Witnesses

A. B. BOND.
HEATING AND VENTILATING SYSTEM FOR INCUBATORS AND BROODERS.
APPLICATION FILED SEPT. 2, 1914.

1,247,496.

Patented Nov. 20, 1917.
3 SHEETS—SHEET 2.

Witnesses

Inventor
A. B. Bond,
By Victor J. Evans
Attorney

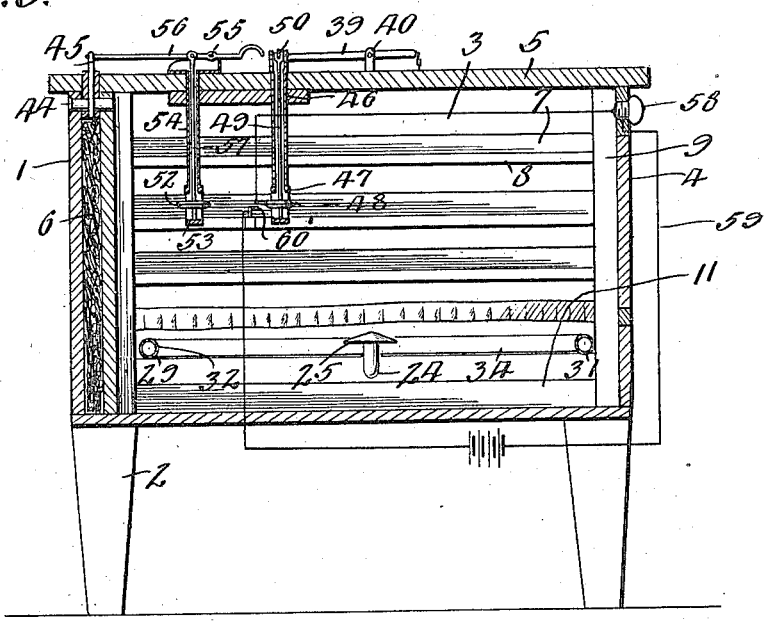
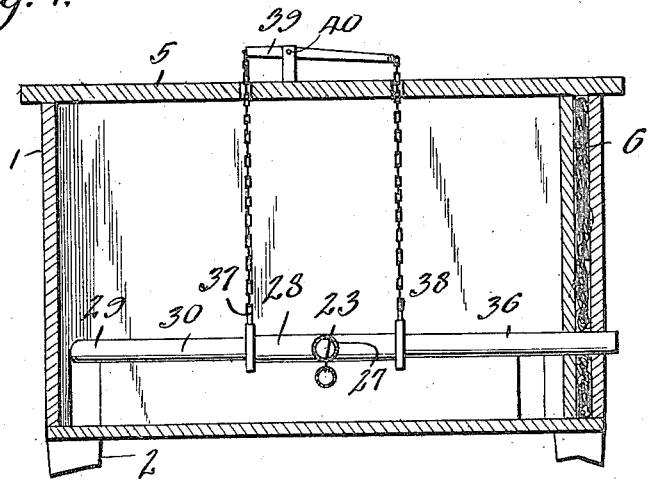

UNITED STATES PATENT OFFICE.

ALICE B. BOND, OF VISALIA, CALIFORNIA.

HEATING AND VENTILATING SYSTEM FOR INCUBATORS AND BROODERS.

1,247,496.  Specification of Letters Patent.  Patented Nov. 20, 1917.

Application filed September 2, 1914. Serial No. 859,841.

*To all whom it may concern:*

Be it known that I, ALICE B. BOND, a citizen of the United States, residing at Visalia, in the county of Tulare and State of California, have invented new and useful Improvements in Heating and Ventilating Systems for Incubators and Brooders, of which the following is a specification.

This invention is an improved heating and ventilating system for use in an incubator, a brooder, or other like device in which it is required that a moist atmosphere and an even temperature be maintained, the invention consisting in the construction, combination and arrangement of devices hereinafter described and claimed.

One object of the invention is to effect improvements in the heating means.

Another object is to combine with the heating means an improved automatically operating mechanism for controlling the supply of heated air to the incubator or brooder and to ventilate the same and prevent the accumulation of foul air therein.

Another object is to provide improved means for indicating an undesirable increase of temperature.

In the accompanying drawings:—

Fig. 3 is a vertical sectional view of the same on the plane indicated by the line $a$—$a$ of Fig. 1.

Fig. 4 is a similar view on the plane indicated by the line $b$—$b$ of Fig. 1.

Figure 1:
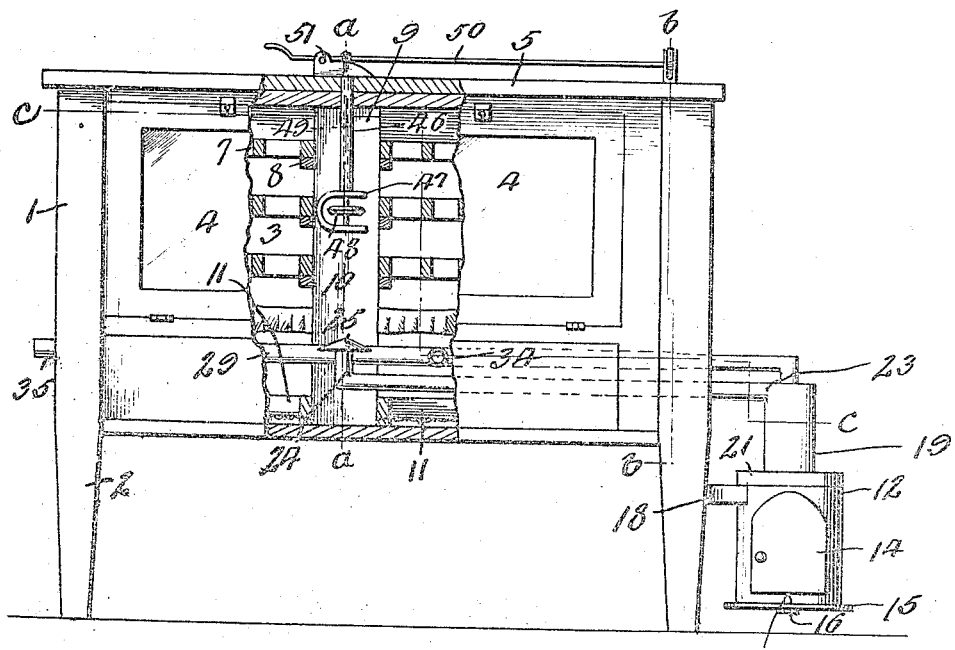
Figure 1 is partly an elevation and partly a vertical longitudinal sectional view of an incubator provided with a heating and ventilating system constructed in accordance with my invention.
Figure 6:
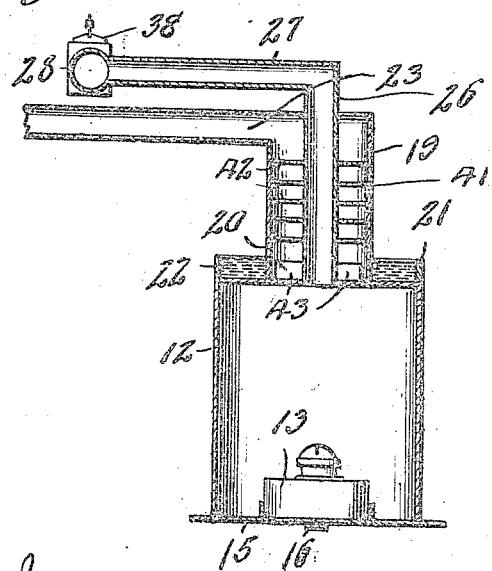
Fig. 6 is a sectional view through the lamp casing and the air heating drum associated therewith taken approximately on the line 6—6 of Fig. 2.
Figure 2:
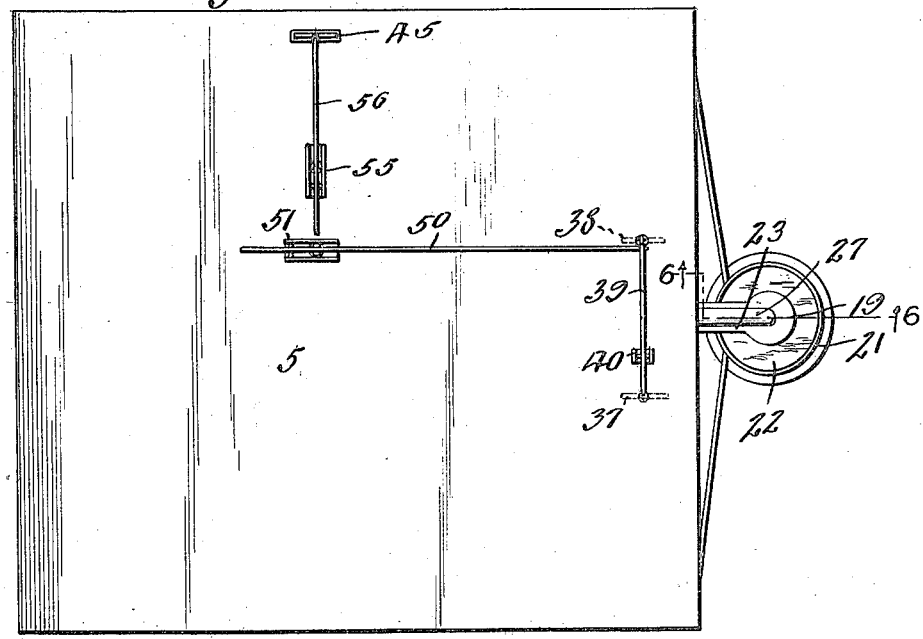
Fig. 2 is a plan of the same.
Figure 5:
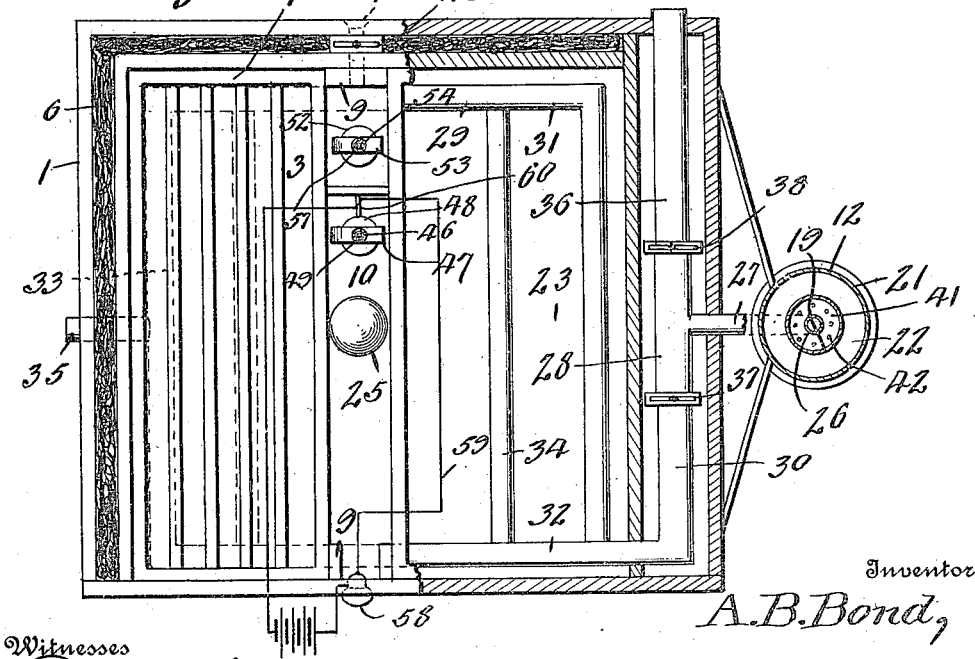
Fig. 5 is a sectional view taken through the incubator on the line C—C of Fig. 1.

For the purposes of this specification an incubator is here shown as provided with my improved heating and ventilating system, the body of the incubator being indicated at 1, provided at its corners with supporting legs 2 and having an incubating chamber 3, doors 4 to afford access to said chamber and a top or cover 5. The body of the incubator may be of any suitable construction within the scope of my invention and is here shown as having double walls and packing or insulation 6 between the walls.

Egg racks or carriers 7 are indicated as arranged in two tiers and supported on flanges 8 which are attached to the walls and to pairs of spaced standards 9 within the incubator, the said tiers of egg trays being separated so that a space 10 is formed between them. Nursery trays 11 may be arranged under each tier of egg trays for the young chickens when hatched. The egg trays and nursery trays are movable and access is afforded thereto and to all parts of the incubating chamber by the doors.

In accordance with my invention I provide a casing 12 for the reception of a suitable lamp of ordinary construction and such as indicated at 13. This casing is vertically arranged, cylindrical in form, and has an opening in one side to afford access to the lamp, said opening being provided with a suitable door or closure 14. The bottom 15 of the casing is hinged at one side as at 16 and provided at the opposite side with a spring clasp 17 to secure the bottom in closed horizontal position. The casing is supported by brackets 18 on one end of the incubator body.

A vertically extending cylindrical air heating drum 19 is secured on the center of the top of the casing 12 and is provided at a point near its lower end with air intake openings 20. A wall or flange 21 is secured on the top of the casing and is spaced from and extends around the base of the air heating drum and forms a water receptacle 22 as shown. A hot air discharge pipe 23 leads from the upper end of the air heating drum into the incubating chamber and has an upturned inner end or arm 24 which discharges heated air under all parts of a distributing hood 25 which is arranged in the center of said chamber and which serves to distribute the heated air equally to all parts of the egg or incubating chamber.

A heat conveying pipe 26 which is of less diameter than the air heating drum passes vertically through the center of the latter and through the upper and lower ends thereof and is provided at its upper end with a horizontally arranged arm 27 which extends through one end wall of the body and is connected to a T-coupling 28 within the incubator body.

A heat radiator 29 is arranged in the incubating chamber below the tiers of egg carriers and has an intake arm 30 which is connected to one end of the T-coupling. This radiator comprises tubular side members 31—32 and tubular connection members 33—34 which connect said side members and which are suitably spaced apart. The tubular member 33 has a centrally arranged discharge tube 35 which extends through the opposite end of the body from the T-coupling 28. A heat discharge pipe 36 has connection with the opposite end of the T-coupling and passes out through one side wall of the body.

The intake arm 30 and heat discharge pipe 36 are respectively provided with vertically movable valves or shutters 37—38 which operate in vertical guideways with which said arm and discharge pipe are provided. Said valves are connected together by a beam 39 which is fulcrumed on a standard 40 and causes the said valves to move simultaneously in reverse directions so that when one of them is in open position the other will be in closed position.

Horizontal baffles 41 are arranged in the drum 19 and have central openings through which the chimney pipe 26 passes and are also provided with spaced openings 42. Vertically arranged substantially radial baffles and heat retaining and radiating fins 43 are placed in the spaces between the baffles 41. Said baffles and fins provide tortuous passages for the air which passes up through the drum, so as to retard the passage of air through the drum and cause it to be thoroughly heated before being discharged into the radiator 29. The water in the receptacle 22 is heated also and gives off steam or vapor which is drawn into the air heating drum through the opening 20 so that the air is heated in the drum and is moistened to an extent such as is required to promote the incubation of the eggs in the egg chamber.

One side wall of the incubator is provided with an air escape opening 44 which has a vertically movable valve or shutter 45.

A tubular casing 46 is arranged vertically and extends down through the top of the incubator and is provided at its lower end with a holder 47 which is arranged in the central space 10 in the incubator, the holder supporting a thermostat 48. A pin 49 extends up from the thermostat through the said casing and its upper end engages a lever 50 which is pivotally mounted in bearings 51 on the upper end of the casing, the said lever being connected to the end of the beam 39 above the valve 38.

A second thermostat 52 is arranged in a holder 53 at the lower end of a tubular casing 54 which is similar to the casing 46 and extends down through the top of the incubator and is provided at its upper end with bearings 55 for a lever 56 which is connected to the valve 45. The pin 57 of said thermostat 52 passes up through the casing 54 and is connected to said lever 56. The valve 45 is normally closed but when the thermostat 52 expands, the said valve 45, through the instrumentality of the lever 56 and the pin which is connected with said lever is opened so as to permit escape of heated air from the incubating chamber.

Normally the valve 38 is closed and the valve 37 is open so that the heat from the lamp is caused to pass through all the members of the radiator or heat distributing members 29 before escaping at 35. While the heat in the incubator chamber is at the desired degree the valve 37 remains open and the valve 38 closed but on an increase of the temperature the thermostat 49 by expanding causes the lever 50 to be operated and said lever turns the beam 39 so as to close the valve 37 and open the valve 38 and thereby cut off further supply of heat from the radiator and cause the heat from the lamp to be discharged into the outer air directly through the pipe 36. As soon as the temperature becomes lowered the valve 38 is again closed and the valve 37 opened and hence the thermostatically operated valve acts automatically to maintain the required temperature in the incubating chamber under all conditions. In practice the thermostat 52 is regulated so as to cause the heated air in the incubating chamber to be discharged when the temperature thereof is one degree above the desired temperature for incubating the eggs.

I also provide a signaling element which is here shown as an electric lamp 58. This is included in an electric circuit 59, the said circuit including a circuit closer 60 which is controlled by the thermostat 48. When the temperature is below the required degree this electric circuit is closed by the thermostat, thereby causing the lamp to be operated or lighted and the same continues, in operation until the temperature is raised to the required degree. Hence in the event of a decreased temperature to an undesirable extent the lamp or other signaling elements indicate such fact and reminds the attendant that the incubator needs attention.

Having thus described my invention, I claim:—

In a device of the class described, a radiator having a discharge opening at one end thereof, a heater casing spaced from the other end of said radiator, a heat pipe in communication with said heater casing extending above the same and toward said radiator, air moistening means on said heater casing, an air heating drum on said heat pipe extending above said air moistening means and in communication therewith, a hot air pipe communicating with said air heating drum above said moistening means having its discharge end arranged in a plane parallel with and central of said radiator, a heat discharge pipe adjacent the last mentioned end of said radiator, a coupling connected with the heat discharge pipe radiator and heat pipe, and a pair of connected mechanically operated valves arranged respectively in said radiator and heat discharge pipe.

In testimony whereof I affix my signature in presence of two witnesses.

ALICE B. BOND.

Witnesses:
EARL A. BAGBY,
MAY M. CROSS.

Copies of this patent may be obtained for five cents each, by addressing the "Commissioner of Patents, Washington, D. C."